T. SLAWSON.
BEET HARVESTER.
APPLICATION FILED JULY 31, 1914.
1,209,055.
Patented Dec. 19, 1916.
2 SHEETS—SHEET 1.
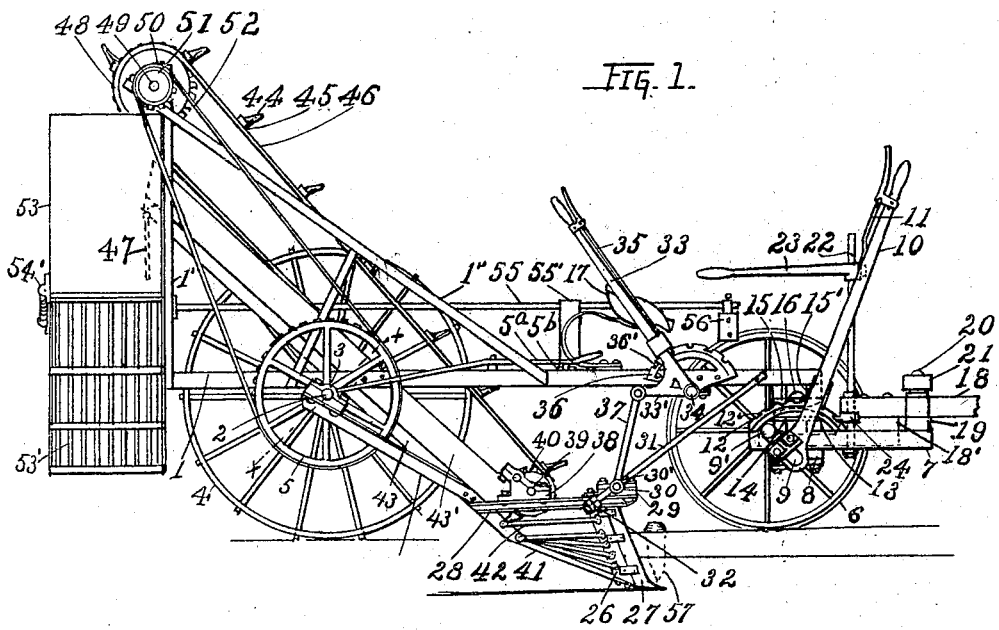
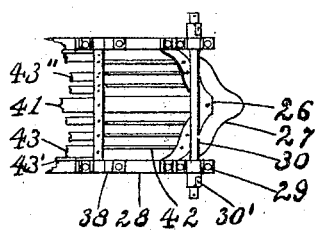
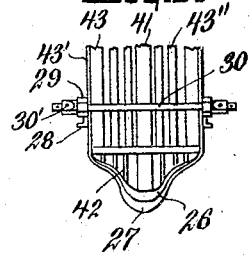
WITNESSES:
INVENTOR.
Thomas Slawson
BY
George W. Hinton
ATTORNEY.

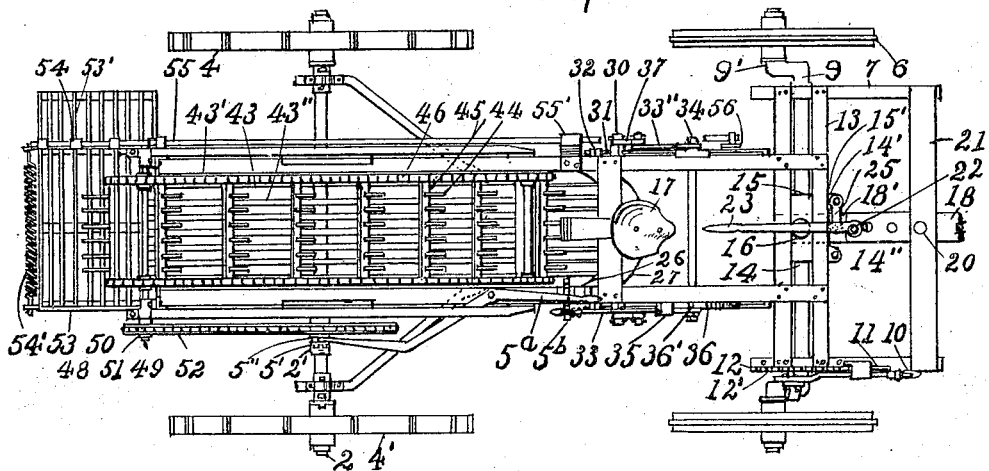
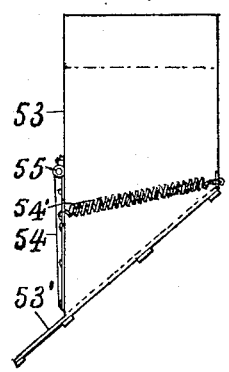
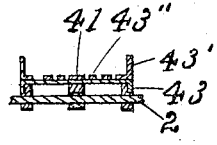

UNITED STATES PATENT OFFICE.

THOMAS SLAWSON, OF NEAR REA, MISSOURI.

BEET-HARVESTER.

1,209,055.  Specification of Letters Patent.  Patented Dec. 19, 1916.

Application filed July 31, 1914. Serial No. 854,349.

*To all whom it may concern:*

Be it known that I, THOMAS SLAWSON, a citizen of the United States, residing near Rea, in the county of Andrew and State of Missouri, have invented certain new and useful Improvements in Beet-Harvesters, of which the following is a specification, reference being had therein to the accompanying drawing.

My invention relates to improvements in that class of beet harvesters which are designed to dig beets from the earth and to clean and deposit the same in the field in which they are grown.

The objects of my improvements are, first: to provide a simple, substantial and durable implement of this class, by the use of which beets are plowed from the earth, and are practically cleaned by devices which displace the minimum amount of earth, and by which the earth is not lifted to any appreciable height, thereby rendering the implement extremely light of draft, second; to provide raising and lowering means whereby the depth of the plow in the ground is regulated, and whereby the plow is raised clear of the ground for transporting the same, when not in use as a harvester, third; to so construct an implement of this class, that the same shall be neat in appearance and comparatively cheap in cost of manufacture. I attain these objects by the mechanism illustrated in the accompanying drawings, in which:—

Figure 1 is a side elevation of the beet harvester, the right wheels being removed to avoid obscurity. Fig. 2 is a top plan of the plow and certain ones of its connected parts. Fig. 3 is a front view of the parts shown in Fig. 2. Fig. 4 is a top plan of the harvester. Fig. 5 is a rear view of the dump box. Fig. 6 is a transverse section on the line X—X, seen in Fig. 1, showing details of the elevator.

Referring to Fig. 1, the rear end portion of frame 1 is mounted on rear axle 2, and is provided with journal boxes 3, in which said axle is rotatable. Left rear wheel 4, (see Fig. 4,) is rotatably mounted on the left end of axle 2. The right end of said axle is secured in right rear wheel 4', which acts as a drive wheel therefor. Drive sprocket 5, is loosely mounted on said axle, and has clutch member 5' formed therewith. Said sprocket is also provided with channeled hub 5" engaged by shift lever 5ª for sliding said clutch member from and into engagement with clutch member 2', secured on axle 2. Said shift lever is pivotally mounted on frame 1, and is provided with holding means 5ᵇ, secured on said frame; said holding means being adapted to hold the free end of said lever in two positions, with the thereby operated clutch members either in or out of engagement, as desired, for controlling the hereinafter described elevator.

The front end of frame 1 is mounted on front wheels 6, by the following described parts. Hounds 7 are provided with journal boxes 8, secured thereunder, in which the cranked front axle 9 is rotatable. The cranked extremities 9' of said axle have said front wheels rotatably mounted thereon. The lower end of lift lever 10 is secured to one of the cranked portions of said axle, and is held in its various adjustments by latch bolt 11, which is adapted to engage ratchet notches 12', formed in segment 12, which latter is securely mounted on one of the hounds 7, for lifting and adjustably holding the front end of frame 1, at any desired height. Sandboards 13 are secured transversely on the rear end portions of hounds 7, and have sandboard plate 14 secured thereon. Said plate has its upper surface rounded and has extension 14' formed on the front edge thereof; the latter has apertures 14" formed therethrough. Bolster plate 15 has its lower surface rounded and resting on said sandboard plate. King-bolt 16 is passed through both of said plates, and together with the described parts forms pivotal mounting means for the front end of frame 1, which latter is secured on bolsters 15', secured on said bolster plate. Said frame has seat 17 securely mounted thereon from which the driver operates the following described tongue guiding means and the lift lever 10. Tongue 18 is pivotally mounted on hound connection 19, by bolt 20, which bolt also pivotally secures double-tree 21 on said tongue. The ends of said connection are secured on the front ends of hounds 7. The rear end of said tongue has the offset tongue extension 18' secured thereunder; the rear end of said extension being extended between axle 9 and sandboards 13. The vertical shaft 22 has its lower end portion rotatably mounted in said tongue and also in the central portion of said tongue extension. Said shaft has guide lever 23 adjustably secured thereon, and crank 24 secured on said shaft; the end of said crank being link connected with sandboard plate extension 14', by link 25.

Moldboard 26 has a plow share 27 detachably secured on its front edge. Said moldboard and share are preferably of the form shown best in Fig. 3, and are adapted to displace the minimum amount of earth in digging beets. The upper edges of said parts are secured to side beams 28, on the front ends of which journal bearings 29 are secured. Plow shaft 30 is rotatably mounted in said bearings and has brace rod apertures 30' formed through the end portions thereof. The upper ends of brace rods 31 are pivotally connected with frame 1, while their lower end portions are passed through said rod apertures, are screw threaded and have nuts and lock nuts 32 screwed thereon, for so tensioning said rods that they act as draft rods and assist in limiting the full depth of the plow in the ground. Lever 33 is secured on rock shaft 34, rotatably mounted on frame 1. Said lever has crank 33' formed therewith and is provided with latch 35, adapted to engage notches 36', formed in segment 36, secured on frame 1, for detachably holding said plow lever in its various adjusted positions. Crank 33'' (see Fig. 4,) is secured on rock shaft 34. Said crank, and crank 33' are rod connected with plow shaft 30, thus providing plow lifting means, for raising and lowering said plow shaft and the therewith connected parts; one of said rods being seen at 37, in Fig. 1. Journal boxes 38 are secured on side beams 28, and have front carrier shaft 39 rotatably mounted therein, provided with carrier sprockets 40 secured thereon. Mold-board 26 has the front end of land bar 41 secured thereunder, and the front ends of riddle rods 42 secured thereto. The rear ends of said rods are secured to the front edge of elevator bottom 43, which is pivotally mounted on axle 2, as seen in Fig. 6. The rear portion of said land bar extends beneath the center of said elevator bottom and is also pivotally mounted on said axle, thus forming pivotal mounting means, whereby said elevator bottom and said bar, and the therewith connected parts are oscillatably mounted. The thus arranged land bar directly conveys to said axle, a large portion of the thrusting strain, which is exerted against the described plow, when in use, thereby relieving said elevator and riddle rods of said portion of strain, which prevents buckling said rods, and allows them to be made of much smaller diameter. Said elevator bottom is provided with elevator sides 43', and the major portion of the bottom of said elevator is formed of slats 43'' arranged longitudinally therein. Said slats are so arranged that carrier fingers 44 freely travel with their ends between said slats. Said fingers are secured in slats 45, carried by sprocket chains 46, the lower portions of which are carried on sprockets 40. The upper end of the described elevator has apron 47 hinged thereto; for practically closing the upper portion of the front side of the hereinafter described beet box, for preventing the spilling of beets therethrough. The upper portions of sprocket chains 46 are carried on carrier sprockets 48, secured on shaft 49, rotatably mounted in journal boxes 50, secured on frame uprights 1' and frame braces 1'' at their junctures, the lower ends of said uprights and braces being secured on frame 1. Shaft 49 has sprocket pinion 51 secured on the right end thereof, said pinion being driven by sprocket chain 52, which passes around said pinion and around the previously mentioned drive sprocket 5. Beet box 53 is secured to frame 1 and uprights 1' and is provided with an inclined, extended bottom formed of slats 53'. The upper portion of the front side of said box is cut away, to permit free movement therein, of the discharge end of said elevator. Said box is provided with door 54, secured on the rear end portion of door shaft 55, rotatably mounted on uprights 1' and shaft bracket 55'. The front end of said shaft has knee lever 56 secured thereon. Said door is provided with recover springs 54'.

In the operation of the described beet harvester, with the parts in the position shown, the implement is drawn toward the right by a team of draft animals, hitched in the usual manner to double-tree 21, while the operator acts as driver of said team and sits in seat 17. Said driver has the team guiding lines thrown over his shoulder in the usual manner, his feet resting on the rear one of bolsters 15'. With his left hand said driver grasps guide lever 23, and thereby guides tongue 18 either toward the right or the left as occasion requires. With his right hand he operates lever 10 and thereby regulates the depth of plow share 27 in the ground, for adapting the same to the various lengths of beets 57. It will be understood that said beets are planted in rows, and that plow-share 27 is drawn beneath them in succession. While this is done, practically all of the thus plowed earth gravitates through the spaces between rods 42, and the plowed or dug beets are forced backward into the described elevator, by the incoming beets and earth. Said beets are then dragged upward on slats 43'', by fingers 44, and gravitate from the upper end of said elevator into box 53. When said box is sufficiently filled with beets, the driver (on seat 17,) with his left knee presses the lower end of lever 56 outward, thereby rotates door shaft 55, overcomes recover springs 54' and swings the bottom edge of door 54 outward, upon which the beets in said box gravitate onto the ground. Upon removal of said driver's knee, said recover springs close said door. During these operations, it will be understood, that said driver, after properly regulating the depth of plow-share 27 removes his right hand from lever 10, and with it manipulates said team guiding lines, which together with said tongue guiding means, enable said driver to accurately guide the described harvester, and keep the same in alinement with a row of beets. When desired said driver again grasps lever 10, and thereby lifts the front end of frame 1, to the limit of the movement of said lever, and latches said lever, after which he moves his hand therefrom and grasps lever 33, and moves the same forward to the limit of its movement, and latches the same, for additionally lifting share 27, which is thus lifted clear of the surface of the ground. Said driver then, by shift lever 5ª disengages the previously described elevator driving means, after which the implement is ready to be transported. When it is again desired to harvest beets, the parts of the harvester are returned to the position shown, by reversing the previously described operations of the levers.

Having fully described my invention, what I claim as new and desire to secure by Letters Patent is:—

1. The combination with a frame transportably supported on a rear axle and a front axle and transporting wheels therefor; of an elevator adapted to elevate beets said elevator being oscillatably mounted on said rear axle; a mold-board of a plow adapted to dig beets from a field; a land bar having its front end secured to the under surface of said mold-board and its rear end portion secured to the under surface of said elevator said rear end portion of said landbar being oscillatably mounted on said rear axle between the oscillatable mountings of said elevator there being a space between said elevator and said mold-board; a plurality of riddle rods having their front ends secured to said mold-board and their rear ends secured on the front edge of said elevator; a plow share secured on the front edge of said mold-board; and oscillating means connected with said mold-board whereby the same and the therewith connected elevator are oscillated.

2. In a beet harvester the combination with an oscillatably mounted beet elevator, of a beet plow; side beams whereby said plow and elevator are securely connected; a plow shaft oscillatably mounted on the front ends of said beams; a frame for said harvester; draft rods having their upper ends pivotally connected with said frame and their lower end portions slidably passed through the end portions of said plow shaft; a rock-shaft oscillatably mounted on said frame; cranks secured on said rock-shaft; connecting rods whereby the ends of said cranks are rod connected with the ends of said plow shaft; oscillating means whereby said rock-shaft is oscillated; detachable holding means whereby said oscillating means are held in variously adjusted positions; and adjusting means on the lower ends of said draft rods whereby the strain on said rods is adjusted.

In testimony whereof I affix my signature in the presence of two witnesses.

THOMAS SLAWSON.

Witnesses:
 Asa M. Petterson,
 George R. Abell.

Copies of this patent may be obtained for five cents each, by addressing the "Commissioner of Patents, Washington, D. C."